United States Patent
Colciago (12)

(10) Patent No.: US 9,154,744 B2
(45) Date of Patent: Oct. 6, 2015

(54) AUTOMATIC CONFIGURATION OF CONNECTION FROM CAMERA TO VIDEO MANAGEMENT SERVER

(75) Inventor: Fabrizio Colciago, Carate Brianza (IT)

(73) Assignee: MARCH NETWORKS CORPORATION, Ottawa (CA)

( * ) Notice: Subject to any disclaimer, the term of this patent is extended or adjusted under 35 U.S.C. 154(b) by 929 days.

(21) Appl. No.: 13/097,165

(22) Filed: Apr. 29, 2011

(65) Prior Publication Data

US 2012/0105629 A1  May 3, 2012

(30) Foreign Application Priority Data

Apr. 30, 2010 (IT) ................................ MI2010A0746

(51) Int. Cl.
*H04N 7/18* (2006.01)
*H04N 5/232* (2006.01)
(Continued)

(52) U.S. Cl.
CPC ............ *H04N 7/181* (2013.01); *H04L 12/2812* (2013.01); *H04L 65/1073* (2013.01); *H04L 67/303* (2013.01); *H04N 7/185* (2013.01); *H04N 21/2187* (2013.01); *H04N 21/2665* (2013.01);
(Continued)

(58) Field of Classification Search
CPC .............. H04L 12/2812; H04L 67/303; H04L 65/1073; H04L 2012/2849; H04N 7/181; H04N 7/185; H04N 21/2665; H04N 21/47202; H04N 21/6581; H04N 21/2187
USPC ......................................................... 348/143
See application file for complete search history.

(56) References Cited

U.S. PATENT DOCUMENTS 6,680,746 B2 * 1/2004 Kawai et al. ................ 348/211.9
7,705,737 B2 * 4/2010 Senga ......................... 340/573.4
(Continued)

FOREIGN PATENT DOCUMENTS

EP 1742153 1/2007

OTHER PUBLICATIONS

Rodriguez-Martinez et al., "Registration and Discovery of Services in the NetTraveler Integration System for Mobile Devices," Proceedings of the International Conference on Information Technology: Coding and Computing, ITCC 2004, Apr. 5, 2004, IEEE Computer Society, 7 pages, Piscataway, New Jersey, United States.
(Continued)

*Primary Examiner* — Hee-Yong Kim
(74) *Attorney, Agent, or Firm* — Dennis R. Haszko

(57) ABSTRACT

A method and system are provided for configuring or registering an edge device with a video management server (VMS) in a digital video network. The edge device initiates a registration process and sends an unsolicited pre-registration request, including edge-device-specific configuration information, to the VMS. This is in contrast to known approaches in which the VMS initiates registration. The VMS automatically pre-registers the edge device based on the received unsolicited pre-registration request. An edge device registration activator is displayed for the pre-registered edge device. In response to activation or selection of the edge device registration activator, the VMS registers the pre-registered device to the VMS using the edge-device-specific configuration information received in the unsolicited pre-registration request. The registration can be performed in a single operation, without the VMS having to gather further information. The edge device can be configured to more than one VMS at a time.

22 Claims, 5 Drawing Sheets

(51) Int. Cl.
| | |
|---|---|
| G08B 23/00 | (2006.01) |
| H04L 12/28 | (2006.01) |
| H04N 21/2187 | (2011.01) |
| H04N 21/2665 | (2011.01) |
| H04N 21/472 | (2011.01) |
| H04N 21/658 | (2011.01) |
| H04L 29/06 | (2006.01) |
| H04L 29/08 | (2006.01) |

(52) U.S. Cl.
CPC ..... *H04N 21/47202* (2013.01); *H04N 21/6581* (2013.01); *H04L 2012/2849* (2013.01)

(56) References Cited

U.S. PATENT DOCUMENTS

| | | |
|---|---|---|
| 2003/0063608 A1 | 4/2003 | Moonen |
| 2004/0080615 A1 | 4/2004 | Klein et al. |
| 2004/0212679 A1 | 10/2004 | Jun |
| 2004/0233904 A1 | 11/2004 | Saint-Hilaire et al. |
| 2006/0232677 A1 | 10/2006 | Butaney et al. |
| 2006/0279628 A1 | 12/2006 | Fleming |
| 2008/0100705 A1 | 5/2008 | Kister et al. |
| 2009/0041298 A1 | 2/2009 | Sandler et al. |
| 2009/0265747 A1 | 10/2009 | Li |
| 2009/0268024 A1 | 10/2009 | Tsukuda et al. |
| 2009/0289788 A1 | 11/2009 | Leblond |
| 2011/0117881 A1* | 5/2011 | Luoma et al. ............. 455/410 |

OTHER PUBLICATIONS

Sony Electronics, Inc., NSR Series—Network Surveillance Recorders, brochure, S-NSRSERIES MK10215V1, Mar. 2006, 8 pages, Park Ridge, New Jersey, United States.

The Hague, Italian Patent Application MI 2010 0746, Search Report and Opinion, 7 pages, Jan. 7, 2011, Netherlands.

Rodriguez-Martinez et al., "Registration and Discovery of Services in the NetTraveler Integration System for Mobile Devices", Proceedings of the International Conference on Information Technology: Coding and Computing (ITCC 2004) in Las Vegas, Nevada, United States on Apr. 5-7, 2004, IEEE Computer Society, Piscataway, New Jersey, United States, 7 pages.

* cited by examiner

AUTOMATIC CONFIGURATION OF CONNECTION FROM CAMERA TO VIDEO MANAGEMENT SERVER

FIELD

The present disclosure relates generally to digital video networks. More particularly, the present disclosure relates to configuration of an edge device, such as a camera, with respect to a server in a digital video network, and related communication.

BACKGROUND

Video surveillance systems are used to keep watch over physical areas to assist in identifying events of interest. Such events, and associated data, can relate to maintaining safety and security, mitigating risk, increasing operational efficiency, preventing loss of products or revenue, gathering business intelligence, and a variety of other applications.

FIG. 1 is a block diagram illustrating a digital video network 100, such as a video surveillance network. The video surveillance network 100 includes a plurality of edge devices 102, shown in FIG. 1 as cameras. The edge devices 102 are in communication with a video management server (VMS) 104, such as via a communications network 106. A client 108, in communication with the edge devices 102 and the VMS 104, can be used to configure various aspects of the network.

To configure a camera 102 to a VMS 104 according to known approaches, the client 108 typically accesses a video management screen in an interface, and makes a selection to display cameras. After selecting the cameras, the user can typically select a "discover" function, which yields a further camera configuration interface.

FIG. 2 illustrates an example of such a known camera configuration interface 110. In this screen, or interface, 110, a listing is provided of all cameras found in the network. The listing includes a plurality of camera entries 112. The interface 110 can also include command buttons 114, which can be used to confirm a request to configure a camera identified by selecting its camera entry 112. The selection can be made in various manners, such as using checkboxes, highlighting or clicking the entry 112 itself, or by any other suitable means.

Referring back to FIG. 1, in such an approach, the VMS 104 sends a message to the communications network 106 to obtain information regarding cameras 102 or other elements or devices connected to the VMS 104. To add a camera 102 or other video provider, it is difficult to determine exactly which camera it is, based only on the name that is displayed, such as shown in FIG. 2.

Sometimes an IP address is also displayed. However, this information often does not assist in properly identifying a camera. Even if it is possible to determine which camera it is solely based on the device name or IP address, there is no indication of whether the device has already been configured into the system. The system simply sends a message regarding the presence of edge devices. The edge devices reply only with an indication of their presence, and provide no further information. To add a channel according to known approaches, the user needs to select the camera and the channel, only based on the camera and channel names, and add it. It may also be necessary to log in as an administrator to complete the process.

It is, therefore, desirable to improve on known camera configuration or registration approaches.

BRIEF DESCRIPTION OF THE DRAWINGS

Aspects and features of the present disclosure will become apparent to those ordinarily skilled in the art upon review of the following description of specific embodiments in conjunction with the accompanying figures. Embodiments of the present disclosure will now be described, by way of example only, with reference to the attached Figures.

DETAILED DESCRIPTION

Figure 1:
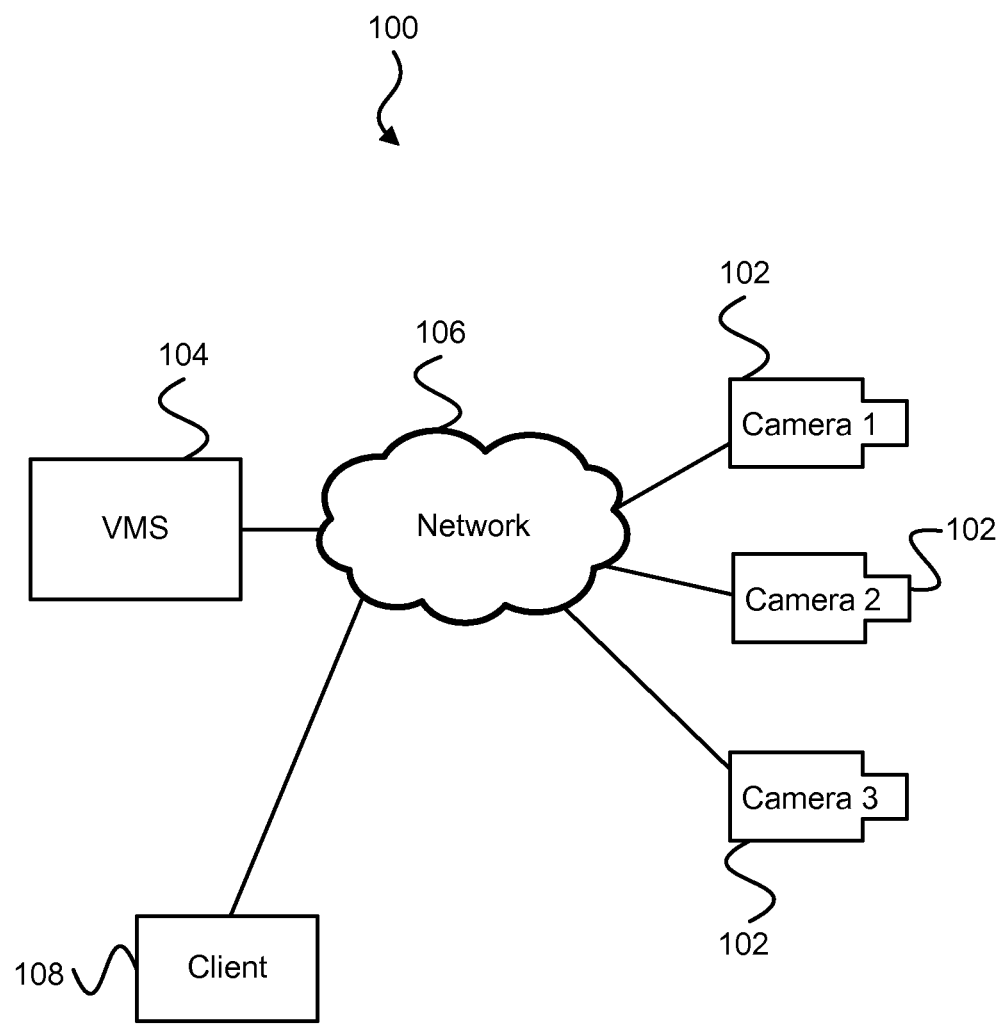
FIG. 1 is a block diagram illustrating a digital video network, such as a video surveillance network.
Figure 2:
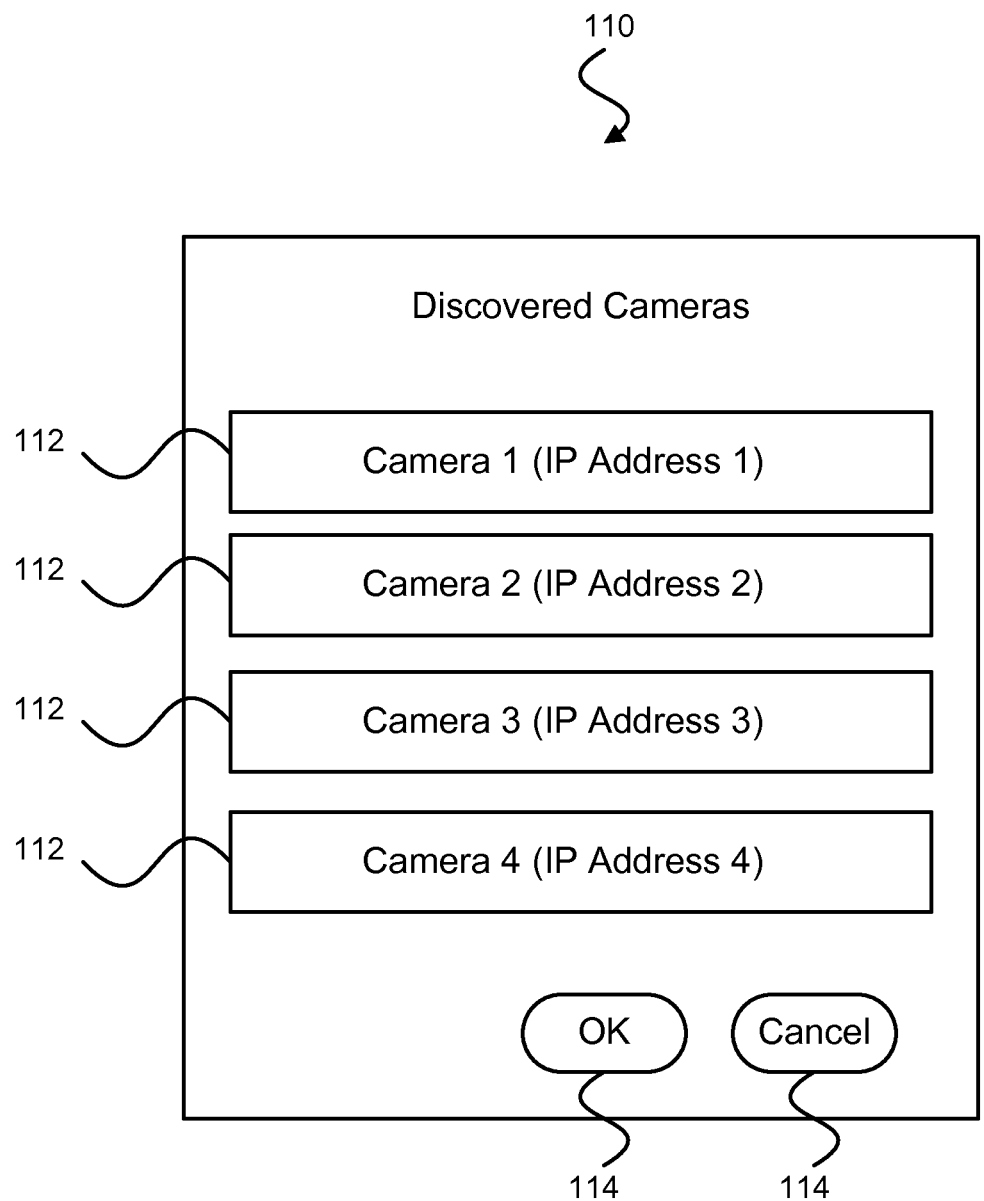
FIG. 2 illustrates a known camera configuration interface.

Generally, the present disclosure provides a method and system for configuring or registering an edge device with a VMS in a digital video network. According to an embodiment of the present disclosure, the edge device initiates a registration process and sends an unsolicited pre-registration request, including edge-device-specific configuration information, to the VMS. This is in contrast to known approaches in which the VMS initiates registration. In a disclosed embodiment, the VMS automatically pre-registers the edge device based on the received unsolicited pre-registration request. An edge device registration activator is displayed for the pre-registered edge device, the edge-device-specific configuration information being associated with the displayed edge device registration activator. In response to activation or selection of the edge device registration activator, the VMS registers the pre-registered device to the VMS using the edge-device-specific configuration information received in the unsolicited pre-registration request. The registration can be performed in a single operation, without the VMS having to gather further information. The edge device can be configured to more than one VMS at a time.

In an embodiment, the present disclosure provides a method of configuring an edge device with a VMS in a digital video network. The method includes: receiving an unsolicited pre-registration request from an edge device, the unsolicited pre-registration request comprising edge-device-specific configuration information; automatically pre-registering the edge device to the VMS based on the received unsolicited pre-registration request; displaying an edge device registration activator for the pre-registered edge device, the edge-device-specific configuration information being associated with the displayed edge device registration activator; and in response to activation of the displayed edge device registration activator, registering the pre-registered edge device to the VMS using the edge-device-specific configuration information received in the unsolicited pre-registration request.

Displaying the edge device registration activator can include adding, to a list of pre-registered edge devices, an entry for a newly pre-registered edge device. Registering the pre-registered edge device to the VMS can be performed in a single-operation without further information gathering by the VMS, in a manner that is free of VMS-initiated information gathering.

The unsolicited pre-registration request can include: an Internet Protocol address associated with the edge device, or a domain name associated with the edge device, or both. When the edge device comprises a camera, the unsolicited pre-registration request can comprise a screenshot of a field of view of the camera. The edge-device-specific configuration information can be assigned from a DHCP server.

In another embodiment, the present disclosure provides a VMS arranged for communication with an edge device in a digital video network. The VMS includes a pre-registration processing module, a pre-registration confirmation module, and a registration module. The pre-registration processing module is configured to receive an unsolicited pre-registration request from the edge device, the unsolicited pre-registration request comprising edge-device-specific configuration information. The pre-registration confirmation module is configured to automatically pre-register the edge device to the VMS based on the received unsolicited pre-registration request, and to display, on a configuration interface, an edge device registration activator for the pre-registered edge device. The edge-device-specific configuration information is associated with the displayed edge device registration activator. The registration module is configured to register the pre-registered edge device to the VMS in response to activation of the displayed edge device registration activator using the edge-device-specific configuration information received in the unsolicited pre-registration request.

The registration module can be configured to register the pre-registered edge device to the VMS in a single-operation without further information gathering by the VMS. The configuration interface can be configured to display a connection status of displayed edge devices. The configuration interface can be configured to display a screenshot of a field of view of each capable edge device listed in the configuration interface.

In a further embodiment, the present disclosure provides a method of configuring an edge device with a VMS in a digital video network. The method includes: initiating, by the edge device, a registration process to register the edge device to the VMS; sending an unsolicited pre-registration request from the edge device to the VMS, the unsolicited registration request comprising edge-device-specific configuration information; and completing a registration process in response to receipt, by the edge device, of a registration request from the VMS based on the activation of a displayed edge device registration activator for the edge device, the displayed edge device registration activator being displayed following pre pre-registration of the edge device to the VMS based on the received unsolicited pre-registration request, the edge-device-specific configuration information being associated with the displayed edge device registration activator.

The method can further include: obtaining the edge-device-specific configuration information by looking up an address corresponding to a domain to which the edge device desires to connect. When the digital video network comprises a second VMS in addition to the first VMS, the method can further include: initiating, by the edge device, a second registration process to register the edge device to the second VMS taking into account registration of the edge device to the first VMS. The edge-device-specific configuration information can assigned from a dynamic host configuration protocol (DHCP) server.

In another embodiment, the present disclosure provides an edge device arranged for communication with a VMS in a digital video network. The edge device includes a registration initiator and a registration consummator. The registration initiator is configured to initiate a registration process to register the edge device to the VMS by sending an unsolicited pre-registration request from the edge device to the VMS, the unsolicited registration request comprising edge-device-specific configuration information. The registration consummator is configured to complete the registration process in response to receipt of a registration request from the VMS based on the activation of a displayed edge device registration activator for the edge device, the displayed edge device registration activator being displayed following pre-registration of the edge device to the VMS based on the received unsolicited pre-registration request, the edge-device-specific configuration information being associated with the displayed edge device registration activator.

The registration initiator can further be configured to obtain the edge-device-specific configuration information by looking up an address corresponding to a domain to which the edge device desires to connect. When the VMS is a first VMS and the digital video network includes a second VMS, the registration initiator can be further configured to initiate a second registration process to register the edge device to the second VMS taking into account registration of the edge device to the first VMS.

In a yet further embodiment, the present disclosure provides a method of configuring an edge device with a VMS in a digital video network, including: initiating, by the edge device, a registration process to register the edge device to the VMS; sending an unsolicited pre-registration request from the edge device to the VMS, the unsolicited registration request comprising edge-device-specific configuration information; automatically pre-registering the edge device to the VMS based on the received unsolicited pre-registration request; displaying an edge device registration activator for the pre-registered edge device; and in response to activation of the displayed edge device registration activator, registering the pre-registered edge device to the VMS using the edge-device-specific configuration information received in the unsolicited pre-registration request.

In another embodiment, the present disclosure provides a digital video network including: a plurality of edge devices including a selected edge device; and a VMS arranged for communication with the selected edge device. The selected edge device is configured to send an unsolicited pre-registration request from the selected edge device to the VMS, the unsolicited registration request comprising edge-device-specific configuration information. The VMS is configured to automatically pre-register the selected edge device to the VMS based on the received unsolicited pre-registration request. The network also includes a configuration interface configured to display a selected edge device registration activator. The VMS is further configured to register the selected edge device to the VMS in response to activation of the edge device registration activator, using the edge-device-specific configuration information received in the unsolicited pre-registration request.

According to an embodiment of the present disclosure, known approaches are reversed and it is the camera that is initiating the transmission and exchange of information with the VMS, for the purposes of configuration or registration. While an edge device or camera in known approaches only provided configuration information to the VMS in response to VMS initiation, according to an embodiment of the present disclosure, a camera provides an unsolicited pre-registration request to the VMS. References to a "camera" with respect to particular embodiments herein are to be understood to also refer generally to edge devices in other embodiments.

To configure a camera to a VMS according to known approaches, in response to a client-initiated request, an edge device replies to a system request indicating only the presence of the edge device. After receiving this presence information, in typical edge device registration in a digital video network, a user brings up a camera configuration interface. The user must then manually input the relevant configuration parameters in order to initiate registration, or associate often cryptic displayed information with the desired configuration.

According to an embodiment of the present disclosure, in pre-registration, an edge device, such as a camera, proactively provides configuration information to a VMS. This is done by sending an unsolicited pre-registration request from the edge device to the VMS. The pre-registration request includes edge-device-specific configuration information. This is in contrast to known approaches, in which an edge device provides only presence information in response to a VMS-initiated request, which itself is the result of a user initiating a configuration sequence for registering the edge device in a digital video network.

Registration of an edge device to a VMS only occurs if camera information and channel information are provided and used in the configuration. Typically, a user needs to select both a camera and an associated channel for the configuration. According to an embodiment of the present disclosure, all information required for registration is provided in the unsolicited pre-registration request.

During registration, the edge-device-specific configuration information from the unsolicited pre-registration request is used within the VMS to register the edge device to the VMS. The edge-device-specific configuration information, or the unsolicited pre-registration request, or both, can be stored in a non-transitory computer readable memory in the VMS, or accessible by the VMS.

There is a standard for communication between a camera and VMS that has been established by ONVIF (Open Network Video Interface Forum), which is an open industry forum for the development of a global standard for the interface of network video products. The ONVIF standard is based on the VMS being the master and the camera, or edge device, being the slave. An end-to-end system according to an embodiment of the present disclosure includes a way of working with the camera that makes the overall system easier to install.

Figure 3:
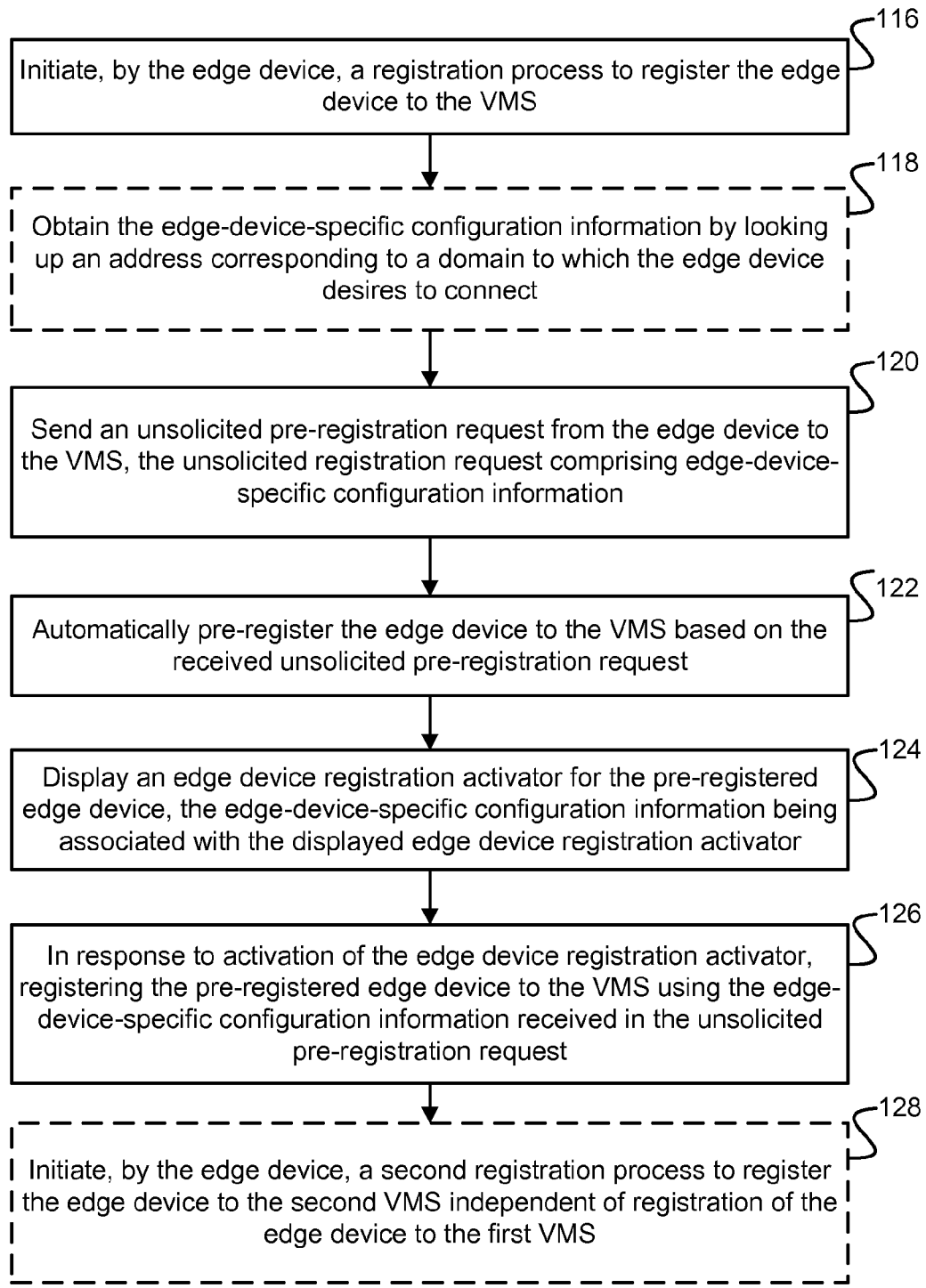
FIG. 3 is a flowchart illustrating a method of configuring an edge device with a VMS in a digital video network according to an embodiment of the present disclosure.

FIG. 3 is a flowchart illustrating a method of configuring an edge device with a VMS in a digital video network according to an embodiment of the present disclosure. The method includes the following: initiating, by the edge device, a registration process to register the edge device to the VMS (step 116); sending an unsolicited pre-registration request from the edge device to the VMS, the unsolicited registration request comprising edge-device-specific configuration information (step 120); automatically pre-registering the edge device to the VMS based on the received unsolicited pre-registration request (step 122); displaying, for example on a control interface, an edge device registration activator for the pre-registered edge device, the edge-device-specific configuration information being associated with the displayed edge device registration activator (step 124); and in response to activation of the edge device registration activator, such as by a client, registering the pre-registered edge device to the VMS using the edge-device-specific configuration information received in the unsolicited pre-registration request (step 126). Displaying the edge device registration activator can include adding, to a list of pre-registered edge devices, an entry for a newly pre-registered edge device.

During pre-registration, edge-device-specific configuration information is provided in the unsolicited pre-registration request sent from the edge device to the VMS. The edge-device-specific configuration information, or the unsolicited pre-registration request, or both, can be stored in a non-transitory computer readable memory in the VMS, or accessible by the VMS. This edge-device-specific configuration information can include one or more of: an IP address associated with the edge device; a domain name associated with the edge device; information assigned from a DHCP server; and, when the edge device is a camera, a screenshot of a field of view of the camera.

Configuring a camera to a VMS is a specific configuration in relation to functionality with the VMS device. In contrast, known approaches of registering a device to a network using universal plug-and-play (UPnP) simply advise the network of the existence of the device and perhaps its capabilities. A UPnP registration is not a configuration of the device to a server. Moreover, UPnP discovery includes a few essential specifics about the device or one of its services, for example, it type, identifier, and a pointer to more detailed information. After a control point has discovered a device, the control point still knows very little about the device. To interact with the device, the control point must retrieve the device's description from the URL provided by the device in the discovery message.

In embodiments of the present invention, the unsolicited pre-registration request includes all of the information that will be required to register the edge device to the VMS. All steps other than the final step of registering the edge device to the VMS are performed automatically in the background, by the VMS or any other capable means in the network. After the user selects the displayed edge device registration activator, the edge device is registered to the VMS. Embodiments described herein provide a solution to the limitations of VMS-initiated edge device registration, as well as to other approaches which only recognize the presence of an edge device and require a user to input further details prior to registration.

Referring back to FIG. 3, the method can further include obtaining the edge-device-specific configuration information by looking up an address corresponding to a domain to which the edge device desires to connect (step 118). In a typical setup, a camera (or other edge device) is connected to a network. The network is connected to a firewall. The firewall is connected to the internet. The VMS is connected to the internet, with the VMS storage connected to the VMS. Between the firewall and the internet, there is a dynamic IP address assignment. In such a setup, it is not easy for the VMS to connect to the camera. First of all, there needs to be a dynamic DNS, in order to manage the dynamic IP. Then, the VMS opens the proper port on the firewall. Then, the port is forwarded to the camera.

According to an embodiment of the present application, the camera already knows the port and domain to which it must connect. For example, the camera can be configured to connect to the domain MARCH-DVMS1. The camera can then automatically look up the address corresponding to the desired domain to which it is to connect, as described in relation to step 118 in FIG. 3. Since firewalls by default are open with respect to outgoing data traffic, the connection request goes out and the camera can automatically connect with the VMS in a pre-registration mode. In an embodiment, the camera sends its IP address and/or domain name, and a screen shot representing its field of view.

At this point, the camera is not yet configured on the VMS. In response to the connection, or pre-registration, with the VMS, the camera will appear on a list of new cameras that have been pre-registered to the system. In the list, the camera name and address will appear, preferably along with a screen shot representing the view of the camera. The VMS administrator, or client, can then simply click on the camera entry in the pre-registered camera list and add the camera to the system, so that it is configured on the VMS. In this way, the VMS administrator does not need to manually configure the IP address, the firewall, open the port, register the dynamic DNS. Instead, a list of automatically pre-registered cameras is generated and provided to the VMS administrator. This again solves the problem of requiring the manual input of configuration information after an edge device has been discovered before it can be registered to the VMS.

Typically, a camera is configured to one server. If it is desired for the camera to be configured to another server, this can be performed intentionally according to an embodiment of the present disclosure. However, using known camera registration processes, this can happen inadvertently, and cause decreased system performance.

In known approaches, the VMS looks around for devices. According to embodiments of the present disclosure, it is the camera that looks for a VMS. Most manufacturers do not make both cameras and VMS, so there is no way to influence their interaction. Typically, the VMS is the master and the camera is the slave. Embodiments of the present disclosure reverse this notion to some extent, and have the camera act as a master.

When there is a first VMS and a second VMS, the edge device can initiate a second registration process to register the edge device to the second VMS taking into account registration of the edge device to the first VMS. The registration of the edge device to the second VMS is performed with knowledge of, and based on knowledge of, the edge device's existing registration to the first VMS. This can avoid the problem of system performance degradation caused by configuration of a camera to more than one VMS, due to the fact that in known approaches an existing registration is not taken into account when establishing a new registration. This can also provide enhanced functionality and flexibility by permitting and enabling registration of an edge device to more than one VMS.

In an embodiment, the present disclosure provides a machine-readable medium storing statements and instructions for execution by a processor to perform a method of configuring an edge device with a VMS in a digital video network, as generally and specifically described and illustrated herein.

Figure 4:
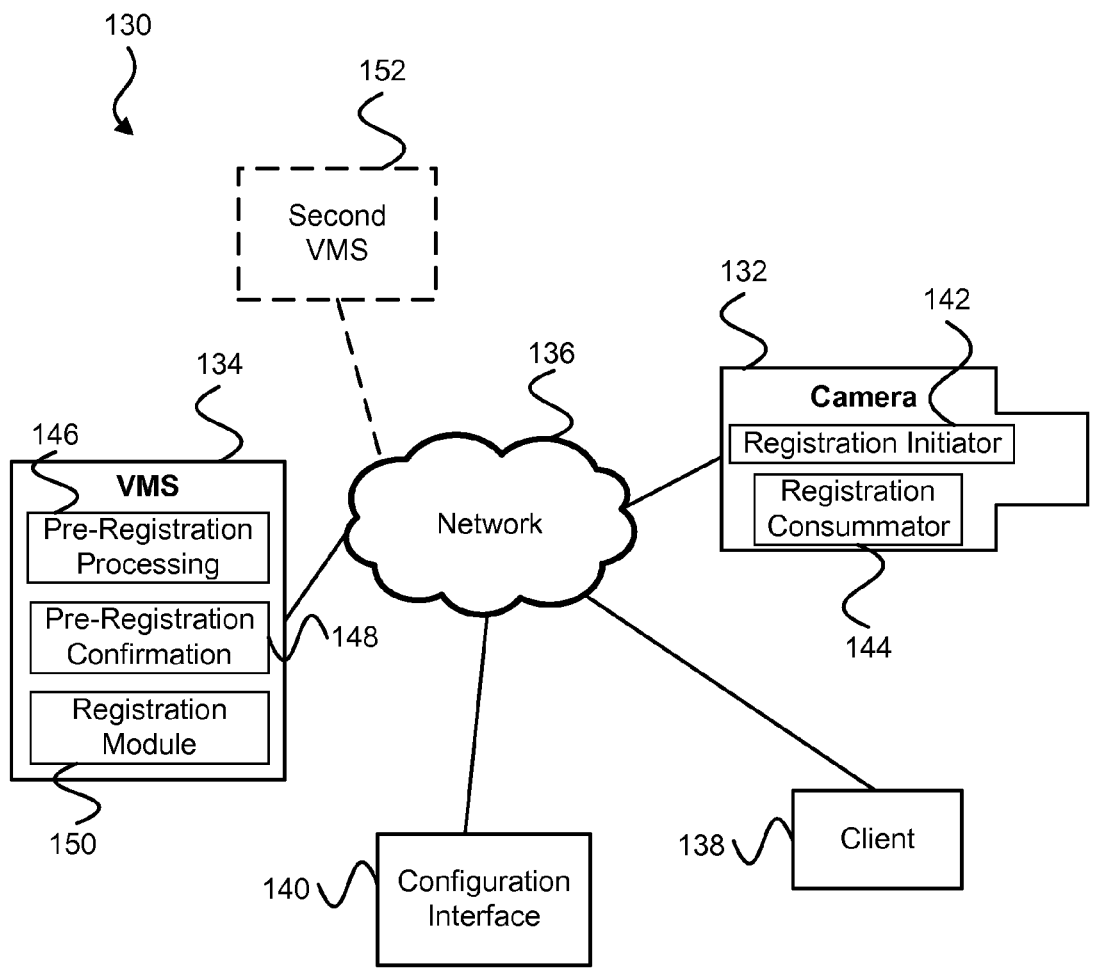
FIG. 4 illustrates a digital video network according to an embodiment of the present disclosure.

FIG. 4 illustrates a digital video network 130 according to an embodiment of the present disclosure. The digital video network 130 can include a plurality of edge devices 132 including a selected edge device, which is the only one illustrated in FIG. 4, and a VMS 134 arranged for communication with the edge devices. The edge devices 132 are in communication with the VMS 134, such as via a communications network 136. A client 138, in communication with the edge devices 132 and the VMS 134, can be used to configure various aspects of the network.

The selected edge device 132 is configured to send an unsolicited pre-registration request from the selected edge device 132 to the VMS 134. The unsolicited registration request includes edge-device-specific configuration information. The VMS 134 is configured to automatically pre-register the selected edge device 132 to the VMS 134 based on the received unsolicited pre-registration request.

The digital video network 130 further includes a configuration interface 140 configured to provide a selected edge device registration activator. The edge device registration activator is associated with the edge-device-specific configuration information from the received unsolicited pre-registration request. The configuration interface 140 is a visual interface for displaying one or more edge device registration activators. In an embodiment, the configuration interface 140 is a graphical user interface that is generated by the VMS 134, the client 138, or by any other suitable means in the network. The configuration interface 140 can be displayed via the client 138.

In response to activation or selection of the edge device registration activator, such as by the client 138, the selected edge device 132 is registered to the VMS 134, such as in a single-operation, using the edge-device-specific configuration information associated with the activator.

The VMS 134 has already received the information required for registration in the unsolicited pre-registration request. As such, single operation registration is achieved by simply using the information required for registration in order to process the registration. No further communication or information gathering is required on the part of the VMS 134. When the necessary information is available, the specific steps involved in registration of an edge device to a VMS are known to one of ordinary skill in the art.

The configuration interface 140 can be configured to provide a connection status of displayed edge devices. The connection status can include one or more of pre-registration status, registration status with respect to the VMS 134 or the VMS 152, or any other VMS. The configuration interface 140 can also be configured to provide a screenshot of a field of view of each capable edge device listed in the configuration interface.

As shown in FIG. 4, the selected edge device can include a registration consummator 144 configured to complete a registration process in response to receipt of a registration request from the VMS 134 based on the activation of a displayed edge device registration activator for the edge device 132. The edge device registration activator is displayed following pre-registration of the edge device 132 to the VMS 134 based on the received unsolicited pre-registration request. A registration initiator 142 can be provided in the selected edge device 132 and configured to initiate the registration process to register the edge device 132 to the VMS 134 by sending the unsolicited pre-registration request from the edge device 132 to the VMS 134.

When an edge device is a camera, embodiments of the present disclosure provide the ability to connect the camera out of the box without performing any manual configuration. The camera can automatically be assigned configuration information from a DHCP server, such as a domain name and an IP address. The assigned camera configuration information can be sent to the VMS for pre-registration. In order to implement this system, certain functionality is provided within the camera. Therefore, it is not simply any generic third party camera that can be configured and pre-registered in this way, but rather a camera according to embodiments described herein. In an embodiment, the functionality of a camera described herein can be added to a generic third-party camera by way of software, firmware or hardware upgrade, in order to preserve existing infrastructure investment.

The VMS 134 can include a pre-registration processing module 146 configured to receive an unsolicited pre-registration request from the edge device, the unsolicited registration request comprising edge-device-specific configuration information. The VMS 134 can further include a pre-registration confirmation module 148 configured to automatically pre-register the edge device to the VMS based on the received unsolicited pre-registration request and to display, on or via a configuration interface, an edge device registration activator for the pre-registered edge device. The VMS 134 can also include a registration module 150 configured to register the pre-registered edge device to the VMS in response to activation of the displayed edge device registration activator using the edge-device-specific configuration information received in the unsolicited pre-registration request.

When the digital video network 130 includes a first VMS 134 and a second VMS 152, the edge device 132 can initiate a second registration process to register the edge device to the second VMS 152 taking into account registration of the edge device to the first VMS 134. In this approach, the edge device 132 is aware of its connections, including registrations, since it has initiated them, and registration to a second VMS is performed taking into account the registration to the first VMS. This can avoid complications in known approaches in which configuration to more than one VMS is discouraged due to possible implications of one registration on the other.

For example, in a digital video network with two or more VMS, a camera can send its information to all VMS. The first VMS that adds the camera to its list of supported cameras can send a message to the camera confirming the configuration of the camera to the first VMS. If a second VMS wants to configure the same camera, this can be done. Usually, in known approaches, a camera is configured to just one VMS. Embodiments of the present disclosure make the registration of the edge device into the VMS smooth and seamless.

In an embodiment, all the cameras can be connected, with each camera having autofocus instead of a manual lens; each camera can be connected with one cable. At the VMS interface, a pre-focused screenshot of each camera's view can be provided in a list of pre-registered edge devices. With one command, the camera is selected and added, with the remaining registration steps occurring automatically in the background. During communication for registration according to embodiments of the present disclosure, the camera is the master and the VMS is the slave.

Figure 5:
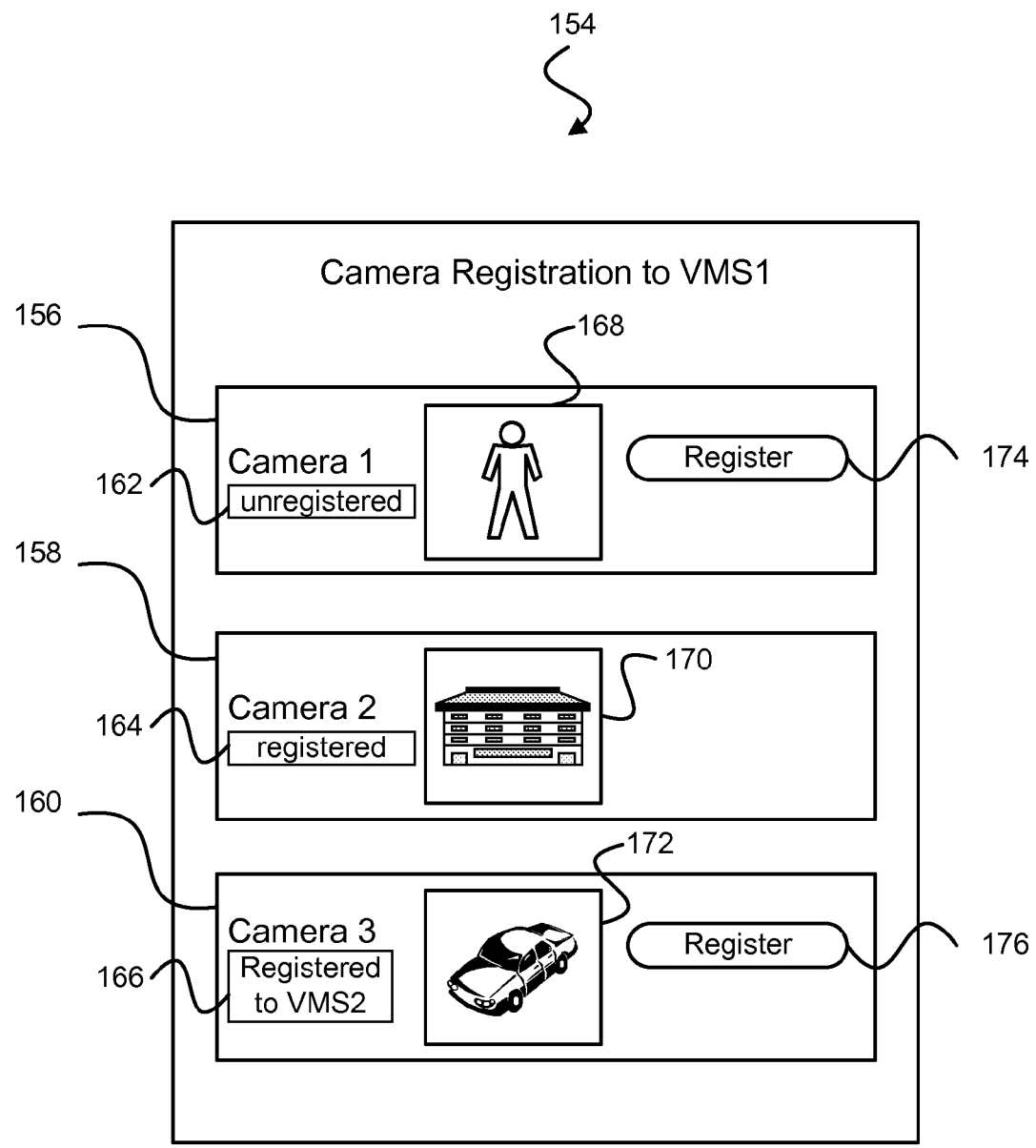
FIG. 5 illustrates an exemplary configuration interface display according to an embodiment of the present disclosure.

FIG. 5 illustrates an exemplary configuration interface display 154 according to an embodiment of the present disclosure. This is an example of a display generated by the VMS or client and displayed via, the configuration interface 140 of FIG. 4. As shown in FIG. 5, entries 156, 158 and 160 are provided in relation to Cameras 1, 2 and 3, respectively, to indicate their pre-registration, or at least their pre-registration in the case of an existing registration. This is a list of pre-registered edge devices to which an entry for a newly pre-registered edge device can be added.

The configuration interface provides, in the display 154, a connection status 162, 164 and 166 of each displayed edge device. For example, connection status 162 indicates that the edge device referred to as Camera 1 is not registered to VMS1. Connection status 164 indicates that the edge device referred to as Camera 2 is registered to VMS1, while connection status 166 indicates that the edge device referred to as Camera 3 is registered to VMS2, with the understanding that it is not registered to VMS1.

As shown in FIG. 5, the configuration interface can provide a screenshot of a field of view of each capable edge device listed in the configuration interface. The exemplary screenshots 168, 170 and 172 provide an indication of the fields of view of Cameras 1, 2 and 3, respectively, to assist an operator or user in selecting the appropriate edge device for configuration and registration.

Also shown in FIG. 5 are edge device registration activators 174 and 176, which are configured to perform automatic registration of the selected edge device to the VMS in a single-operation in response to activation, actuation or selection of the edge device registration activator. The edge device registration activator 174 indicates an ability to register Camera 1 to VMS1, since it is unregistered. The edge device registration activator 176 indicates an ability to register Camera 3 to VMS1, taking into account the existing registration of Camera 3 to VMS2. There is no edge device activator provided for Camera 2, since Camera 2 is already registered to VMS1.

In an embodiment, the edge device registration activator 174 or 176 is displayed as a visual indication in a configuration interface. The visual indication can be textual, graphical, or both. In response to activation by a user of the edge device registration activator, the processing that is required is simply to use the information required for registration to process the registration. As indicated above, the specific steps involved in registration are known to one of ordinary skill in the art. The activation of the edge device registration activator simply requires input by a user or operator of the system, the input being in relation to the configuration interface in which the edge device registration activator is displayed. The activation can comprise selecting the displayed activator, such as by clicking, hovering over, or otherwise activating the displayed activator to indicate its selection.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A server-implemented method of registering an edge device with a video management server (VMS) in a digital video network, comprising:

absent communication from the VMS to the edge device, receiving an unsolicited pre-registration request from the edge device, the unsolicited pre-registration request comprising edge-device-specific configuration information, the unsolicited pre-registration request originating from the edge device to initiate the registering of the edge device with the VMS;

automatically pre-registering the edge device to the VMS based on the received unsolicited pre-registration request;

displaying an edge device registration activator for the pre-registered edge device, the edge-device-specific configuration information being associated with the displayed edge device registration activator; and in response to activation of the displayed edge device registration activator, registering the pre-registered edge device to the VMS using the edge-device-specific configuration information received in the unsolicited pre-registration request, wherein activation is done by selection of the displayed edge device registration activator by a user.

2. The server-implemented method of claim 1 wherein displaying the edge device registration activator comprises adding, to a list of pre-registered edge devices, an entry for a newly pre-registered edge device.

3. The server-implemented method of claim 1 wherein displaying the edge device registration activator comprises displaying a connection status for the edge device.

4. The server-implemented method of claim 1 wherein registering the pre-registered edge device to the VMS is performed in a single-operation without further information gathering by the VMS.

5. The server-implemented method of claim 1 wherein the edge device comprises a camera, and wherein the received unsolicited pre-registration request comprises a screenshot of a field of view of the camera.

6. The server-implemented method of claim 1 wherein the received unsolicited pre-registration request comprises an Internet Protocol address associated with the edge device.

7. The server-implemented method of claim 1 wherein the received unsolicited pre-registration request comprises a domain name associated with the edge device.

8. The server-implemented method of claim 1 wherein the edge-device-specific configuration information is assigned from a dynamic host configuration protocol (DHCP) server.

9. A non-transitory machine-readable medium storing statements and instructions executable by a processor to perform a method of registering an edge device with a video management server (VMS) in a digital video network, comprising:

absent communication from the VMS to the edge device, receiving an unsolicited pre-registration request from the edge device, the unsolicited pre-registration request comprising edge-device-specific configuration information, the unsolicited pre-registration request originating from the edge device to initiate the registering of the edge device with the VMS;

automatically pre-registering the edge device to the VMS based on the received unsolicited pre-registration request;

displaying an edge device registration activator for the pre-registered edge device, the edge-device-specific configuration information being associated with the displayed edge device registration activator; and in response to activation of the displayed edge device registration activator, registering the pre-registered edge device to the VMS using the edge-device-specific configuration information received in the unsolicited pre-registration request, wherein activation is done by selection of the displayed edge device registration activator by a user.

10. A video management server (VMS) arranged for communication with an edge device in a digital video network, the VMS comprising:

a pre-registration processing module configured to receive, absent communication from the VMS to the edge device, an unsolicited pre-registration request from the edge device, the unsolicited pre-registration request comprising edge-device-specific configuration information, the unsolicited pre-registration request originating from the edge device to initiate registration of the edge device with the VMS;

a pre-registration confirmation module configured to automatically pre-register the edge device to the VMS based on the received unsolicited pre-registration request;

a configuration interface module configured to display an edge device registration activator for the pre-registered edge device, the edge-device-specific configuration information being associated with the displayed edge device registration activator; and a registration module configured to register the pre-registered edge device to the VMS in response to activation of the displayed edge device registration activator using the edge-device-specific configuration information received in the unsolicited pre-registration request, wherein activation is done by selection of the displayed edge device registration activator by a user.

11. The VMS of claim 10 wherein the registration module is configured to register the pre-registered edge device to the VMS in a single-operation without further information gathering by the VMS.

12. The VMS of claim 10 wherein the configuration interface is configured to display a connection status of displayed edge devices.

13. The VMS of claim 10 wherein the configuration interface is configured to display a screenshot of a field of view of each capable edge device listed in the configuration interface.

14. An edge-device-implemented method of configuring an edge device with a video management server (VMS) in a digital video network, comprising:

initiating, by the edge device, a registration process to register the edge device to the VMS;

absent communication from the VMS to the edge device, sending an unsolicited pre-registration request from the edge device to the VMS, the unsolicited registration request comprising edge-device-specific configuration information the unsolicited pre-registration request originating from the edge device to initiate the registration process to register the edge device to the VMS; and completing a registration process in response to receipt, by the edge device, of a registration request from the VMS based on the activation of a displayed edge device registration activator for the edge device, the displayed edge device registration activator being displayed following pre pre-registration of the edge device to the VMS based on the received unsolicited pre-registration request, the edge-device-specific configuration information being associated with the displayed edge device registration activator, wherein activation is done by selection of the displayed edge device registration activator by a user.

15. The edge-device-implemented method of claim 14 further comprising:

obtaining the edge-device-specific configuration information by looking up an address corresponding to a domain to which the edge device desires to connect.

16. The edge-device-implemented method of claim 14 wherein the VMS is a first VMS and wherein the digital video network comprises a second VMS, the method further comprising:

initiating, by the edge device, a second registration process to register the edge device to the second VMS taking into account registration of the edge device to the first VMS.

17. The edge-device-implemented method of claim 14 wherein the edge-device-specific configuration information is assigned from a dynamic host configuration protocol (DHCP) server.

18. An edge device arranged for communication with a video management server (VMS) in a digital video network, comprising:
   a registration initiator configured to initiate a registration process to register the edge device to the VMS by sending, absent communication from the VMS to the edge device, an unsolicited pre-registration request from the edge device to the VMS, the unsolicited registration request comprising edge-device-specific configuration information, the unsolicited pre-registration request originating from the edge device to initiate the registration process to register the edge device to the VMS; and
   a registration consummator configured to complete the registration process in response to receipt of a registration request from the VMS based on the activation of a displayed edge device registration activator for the edge device, the displayed edge device registration activator being displayed following pre-registration of the edge device to the VMS based on the received unsolicited pre-registration request, the edge-device-specific configuration information being associated with the displayed edge device registration activator, wherein activation is done by selection of the displayed edge device registration activator by a user.

19. The edge device of claim 18 wherein the registration initiator is further configured to obtain the edge-device-specific configuration information by looking up an address corresponding to a domain to which the edge device desires to connect.

20. The edge device of claim 18 wherein the VMS is a first VMS and wherein the digital video network comprises a second VMS, the registration initiator being further configured to initiate a second registration process to register the edge device to the second VMS taking into account registration of the edge device to the first VMS.

21. A method of configuring an edge device with a video management server (VMS) in a digital video network, comprising:
   initiating, by the edge device, a registration process to register the edge device to the VMS;
   absent communication from the VMS to the edge device, sending an unsolicited pre-registration request from the edge device to the VMS, the unsolicited registration request comprising edge-device-specific configuration information, the unsolicited pre-registration request originating from the edge device to initiate the registration process to register the edge device to the VMS;
   automatically pre-registering the edge device to the VMS based on the received unsolicited pre-registration request;
   displaying an edge device registration activator for the pre-registered edge device; and
   in response to activation of the displayed edge device registration activator, registering the pre-registered edge device to the VMS using the edge-device-specific configuration information received in the unsolicited pre-registration request, wherein activation is done by selection of the displayed edge device registration activator by a user.

22. A digital video network comprising:
   a plurality of edge devices including a selected edge device;
   a video management server (VMS) arranged for communication with the selected edge device;
   the selected edge device configured to send, absent communication from the VMS at the selected edge device, an unsolicited pre-registration request from the selected edge device to the VMS, the unsolicited registration request comprising edge-device-specific configuration information, the unsolicited pre-registration request originating from the edge device to initiate the registration process to register the edge device to the VMS;
   the VMS configured to automatically pre-register the selected edge device to the VMS based on the received unsolicited pre-registration request; and
   a configuration interface configured to display a selected edge device registration activator,
   the VMS further configured to register the selected edge device to the VMS in response to activation of the edge device registration activator, using the edge-device-specific configuration information received in the unsolicited pre-registration request, wherein activation is done by selection of the displayed edge device registration activator by a user.

* * * * *